US005603760A

United States Patent [19]
Berke et al.

[11] Patent Number: 5,603,760
[45] Date of Patent: Feb. 18, 1997

[54] CEMENT ADMIXTURE CAPABLE OF INHIBITING DRYING SHRINKAGE AND METHOD OF USING SAME

[75] Inventors: Neal S. Berke, Chelmsford, Mass.; Michael P. Dallaire, Dover; Angel Abelleira, Nashua, both of N.H.

[73] Assignee: W. R. Grace & Co.-Conn., New York, N.Y.

[21] Appl. No.: 529,392

[22] Filed: Sep. 18, 1995

[51] Int. Cl.⁶ ............................ C04B 24/02; C04B 24/08
[52] U.S. Cl. .................... 106/802; 106/724; 106/727; 106/808; 106/822; 106/823; 106/287.23; 106/287.26
[58] Field of Search ...................... 106/724, 737, 106/738, 802, 822, 823, 819, 727, 808, 287.23, 287.26

[56] References Cited

U.S. PATENT DOCUMENTS

| | | | |
|---|---|---|---|
| 3,486,916 | 12/1969 | Cordon | 106/802 |
| 3,583,880 | 6/1971 | Moren | 427/314 |
| 3,709,707 | 1/1973 | Rehmar | 106/823 |
| 4,141,737 | 2/1979 | Moon | 106/724 |
| 4,302,251 | 11/1981 | Udagawa | 106/728 |
| 4,547,223 | 10/1985 | Goto | 106/802 |
| 4,946,904 | 8/1990 | Akimoto | 106/823 |
| 4,975,121 | 12/1990 | Sakuta | 106/724 |
| 5,016,711 | 5/1991 | Cowan | 106/724 |
| 5,020,598 | 6/1991 | Cowan | 106/724 |
| 5,174,820 | 12/1992 | Sakuta | 106/724 |
| 5,181,961 | 1/1993 | Umaki | 106/724 |
| 5,413,634 | 5/1995 | Shawl | 106/823 |

FOREIGN PATENT DOCUMENTS

| | | |
|---|---|---|
| 308950A1 | 3/1989 | European Pat. Off. . |
| 643022A1 | 3/1995 | European Pat. Off. . |
| 48-43014 | 6/1973 | Japan . |
| 54-110903 | 8/1979 | Japan . |
| 55-027819 | 2/1980 | Japan . |
| 57-145084 | 9/1982 | Japan . |
| 56-500786 | 11/1982 | Japan . |
| 58-60293 | 4/1983 | Japan . |
| 59-21557 | 2/1984 | Japan . |
| 59-128240 | 7/1984 | Japan . |
| 59-128242 | 7/1984 | Japan . |
| 59-128251 | 7/1984 | Japan . |
| 59-131552 | 7/1984 | Japan . |
| 59-137383 | 8/1984 | Japan . |
| 1-145357 | 6/1989 | Japan . |
| 2-051461 | 2/1990 | Japan . |

*Primary Examiner*—Mark L. Bell
*Assistant Examiner*—Michael Marcheschi
*Attorney, Agent, or Firm*—Howard Troffkin

[57] ABSTRACT

A cement admixture composition composed of at least one oxyalkylene compound and an ammonium salt of tall oil fatty acid.

11 Claims, No Drawings

CEMENT ADMIXTURE CAPABLE OF INHIBITING DRYING SHRINKAGE AND METHOD OF USING SAME

BACKGROUND OF THE INVENTION

The present invention is directed to a cement admixture composition capable of causing the combined effects of inhibiting drying shrinkage of hydraulic cement-based compositions while permitting air entrainment to be imparted thereto. The present invention further provides an improved architectural structural concrete formation.

Specifically, the present invention is directed to a cement admixture composed of a synergistic combination of (i) an oxyalkylene compound selected from oxyalkylene glycols and alkenyl ether adducts of glycols and glycerols and (ii) ammonium salts of tall oil fatty acids.

Hydraulic cement compositions, such as mortar (cement, small particulate, e.g. sand, and water), or concrete (cement, small particulate, large particulate, e.g. gravel, and water), are used extensively in forming (either alone as a concrete formation or in combination with other elements as a mortar and brick formation) architectural structural formations. These compositions have certain properties which substantially effect their durability which include shrinkage which occurs during drying and curing of the cement composition and the amount of air entrained in the resultant cast formation.

Conventional hydraulic cement compositions display a decrease in volume with setting and drying of the cast composition. Although the magnitude of the volume decrease is normally small, it is of extreme importance. This shrinkage results in cracks and other defects which lower the serviceability and durability of the resultant structure. The cracks provide a path for air to penetrate into the structure, promoting carbonation of the cement and corrosion of the metal reinforcing bars contained therein. Further, the cracks provide a means for water to seep into and through the structure. Such water entry further deteriorates the structure through freeze-thaw cycling pressures exerted on the cement structure over its life. It is highly desired to provide a cement which exhibits high strength and is not subject to deterioration effects due to shrinkage and freeze-thaw cycling.

Various attempts have been made to avoid the cracking phenomenon caused by drying shrinkage. These include providing joints in the cement structure to concentrate the site of crack formation at the joint and, thereby, minimize such formation at other portions of the structure. Such joints are expensive to install; are not applicable to certain structures such as vertical walls, pillars and the like; and merely concentrate the area of cracking but do not alleviate it.

Other attempts include varying the composition of the cement, varying the methods of manufacture of concrete mix and varying the ballast material used in forming the resultant concrete structure. None of these attempts have resulted in a satisfactory solution. For example, cements have been formulated with expansive admixtures in attempts to counter the shrinkage of the concrete. However, it is difficult to determine the proper amount of expansive admixture required to counter the drying shrinkage which develops. The use of such materials thereby give rise to unpredictable results.

With respect to overcoming the drying shrinkage of cement compositions, such as concrete compositions, the literature teaches that various oxyalkylene adducts are suitable for this purpose. For example, U.S. Pat. Nos. 3,663,251 and 4,547,223 suggest the use of compounds of the general formula $RO(AO)_nH$ in which R may be a $C_{1-7}$ alkyl or $C_{5-6}$ cycloalkyl radical, A may be $C_{2-3}$ alkylene radicals and n is 1–10, as shrinkage reducing additives for cement. Similarly, U.S. Pat. No. 5,174,820 suggests terminally alkyletherified or alkylesterified oxyalkylene polymers as useful for shrinkage reduction. Still further, Japanese Patent Application 58-60293 provides the suggestion that shrinkage reduction of cement can be accomplished by the addition thereto of compounds which are aliphatic, alicyclic or aromatic group terminated oxyethylene and/or oxypropylene repeating chain compounds.

The freeze-thaw pressures are encountered by conventional hydraulic cement structures on a micro-scale (including crack phenomenon) due to seepage of water into the porous cement structure where it resides to exert deteriorating pressure under freeze-thaw conditions. In order to prevent the loss of durability due to this phenomenon, it is common practice to incorporate small amounts of agents capable of causing the entrainment of fine air voids in the hardened hydraulic composition structure (Air entraining agents or AE agents). These agents are well known and include, for example, tall oil fatty acids and their esters, gum resins and rosins, sulfite liquors and the like. The resultant air voids (normally 3–10, preferably 4–8 volume percent) provide empty space for expansive ice crystals to grow into relieving the pressure of water expansion under freeze-thaw conditions.

While oxyalkylene compounds provide a degree of shrinkage inhibition to cement structures, they have been known to cause a deactivation of conventional air entraining agents and, therefore, cause such treated cement structures to have an undesired low degree of air entrainment and/or require a very high dosage of AE agent (which has many disadvantages from a practical and economic standpoint). It is known that air entrainment is desired to aid in permitting the cast cement structure to withstand the compression/expansion forces encountered. The alkylene oxide adducts described above do not permit the structure to have sufficient air entrainment, as required, to provide a structure capable of withstanding compressive/expansive forces and, thereby, extend the structure's useful life. For example, U.S. Pat. No. 3,663,251 shows, by comparative examples, that the inclusion of a polypropylene glycol causes a reduction of the air entrainment provided by the cement being treated with an agent composed of sulfite waste liquor. Further, Canadian Patent 967,321 suggests that polyoxyalkylene glycols as well as their esters, ethers and mixture cause a reduction in foaming in cementitious compositions.

It is highly desired to provide a cement admixture which is capable of inhibiting drying shrinkage of structural cement compositions without causing a reduction in the ability to impart sufficient fine air voids in the hardened hydraulic cement composition.

Further, it is desired to provide a stable cement admixture which is capable of inhibiting drying shrinkage of structural cement compositions and imparting a fine air void structure in the resultant cured formation.

Still further, it is desired to provide a stable cement admixture which is capable of inhibiting drying shrinkage of structural cement composition while permitting the imparting of desired degree of air entrainment using conventional AE agents to provide a structure capable of withstanding compressive/expansive forces and, thereby, extend the structure's useful life.

SUMMARY OF THE INVENTION

The present invention is directed to a cement admixture, and to a method of forming an improved architectural cement composition formation, which is capable of inhibiting drying shrinkage without detracting from the ability of the composition to substantially maintain air void content in the resultant formation. The admixture comprises a synergistic mixture of (i) an oxyalkylene compound selected from oxyalkylene glycols and oxyalkylene ether adducts of glycols or glycerols with (ii) organic ammonium salts of tall oil fatty acids.

DETAILED DESCRIPTION

It has been unexpectedly found that when an oxyalkylene compound, as fully describe hereinbelow is combined with a minor amount of an organic ammonium salt of tall oil fatty acid, one attains a cement admixture composition which inhibits drying shrinkage to a treated cement structure while permitting one to impart air entrainment using conventional amounts of known AE agents. Further, it has been unexpectedly found that stable, uniform compositions of the subject combination of oxyalkylene compound as solute in tall oil fatty acid salt can be formed. The resultant stable solution provides a means for readily dispensing the subject admixture without the concern of separation, the need for emulsifiers or the need to transport large amounts of water as part of the admixture composition.

The subject cement admixture requires the use of an oxyalkylene compound which can be selected from (i) an oxyalkylene glycol or (ii) oxyalkylene ether adducts of alcohols, glycols and glycerols. The oxyalkylene glycol can be represented by the formula $HO(AO)_nH$ (Formula I) where A represents a $C_2$–$C_4$ alkylene group such as ethylene, propylene, butylene and the like and mixtures thereof with ethylene and propylene being preferred; O represents an oxygen atom and n is an integer from 1 to 3. The AO groups in a particular glycol molecule may all be the same or may be different. Examples of such glycols include diethylene glycol, dipropylene glycol, tripropylene glycol, di(ethoxy-)di(propoxy) glycol and the like. Further such glycols may include polyalkylene glycols (poly(oxyalkylene)glycol) having molecular weights up to about 1200. The AO groups forming the chain of such glycols may contain a single type of alkylene ether group or a mixture of alkylene ether groups which may be in block or random arrangement. Examples of the oxalkylene glycols are polypropylene glycol, polyethylene glycol, poly(oxyethylene) (oxypropylene) glycol and the like.

The second class of oxyalkylene compounds used in forming the present admixture are oxyalkylene ether adducts of mono alcohols or polyols. The oxyalkylene adduct of monoalcohols is represented by the formula $RO(AO)_mH$ (Formula IIA) wherein R is hydrocarbon group, such as a $C_1$–$C_7$ alkyl or a $C_5$–$C_6$ cycloalkyl, preferable a $C_3$–$C_5$ alkyl group. Examples of such R groups are methyl, ethyl, propyl, isopropyl, n-butyl, isobutyl, t-butyl, n-pentyl, isopentyl, cyclopentyl, cyclohexyl and the like. The preferred R groups are $C_3$–$C_5$ alkyl such as n-propyl, isopropyl, n-butyl, t-butyl and the like. Where there are more than one R group of a polyol of Formula IIA it is preferred that the R groups are the same. A is a $C_2$–$C_4$ (preferably $C_2$–$C_3$) alkylene group, such as ethylene, propylene and the like and mixtures thereof in the same chain, and m is an integer of from 1 to about 10, Preferably 2 or 3.

The oxyalkylene adduct of polyols are represented by the formula $Q[(OA)_p\text{—}OR']_x$, (Formula IIB), wherein Q represents a $C_3$–$C_{12}$ aliphatic hydrocarbon residual group of a polyhydroxyalkane, such as glycerin, R' independently represents a hydrogen atom or a $C_1$–$C_{14}$ alkyl or cycloalkyl group with the proviso that at least one R' group represents a $C_1$–$C_{14}$ alkyl or cycloalkyl group, preferably a tertiary alkyl group, A represents a $C_2$–$C_4$, preferably a $C_2$–$C_3$, alkylene group or mixtures thereof, O represents oxygen atom, p represents an integer of from 0 to 10 and x represents an integer of 3 to 5.

Illustrative agents of Formula II B employed according to the present invention are derived from $C_3$–$C_{12}$ aliphatic triols, such as glycerol, 1,2,4-butanetriol, 2,3,4-pentanetriol, 2-ethyl-2-(hydroxymethyl)-1,3-butanetriol, 2,3,4-pentanetriol, 2-ethyl-2-(hydroxymethyl)-1,3-propanetriol (trimethylol propane), 1,1,1-tris(hydroxymethyl)ethane, 1,2,6-trihydroxyhexane, 1,2,3-heptanetriol, and the like, $C_4$–$C_{12}$ aliphatic tetrols (e.g. 2,3,4,5-hexanetetrol, sorbitan, erythritol, pentaerythritol), $C_5$–$C_6$ sugar alcohols (including those compounds corresponding to the formula $HOCH_2(CHOH)_nCH_2OH$ wherein n is 3 to 6 such as xylitol, sorbitol, arabitol, mannitol, and the like), monosaccharides (e.g. erythrose, threose, ribose, arabinose, xylose, lyxose, allose, altrose, glucose, mannose, gulose, idose, galactose, fructose, galactose, and the like), disaccharides (e.g. sucrose, lactose, maltose) and alkyl glycosides (e.g. methyl glycosides, ethyl glycosides, propyl glycosides, and other glycoside molecules wherein the alkyl glycoside is an acetal formed by interaction of a $C_1$–$C_{20}$ alcohol with a carbonyl group of a mono- or a disaccharide such as glucose). Also suitable for use as the polyol are polysaccharides such as cellulose, hydroxycellulose, chitin, guar, and starches as well as hydroxy-containing substances such as tetrahydrofuran oligomer, oxetane oligomers, sorbitol oligomers, glycerol oligomers, and the like.

Where there are more than one alkyl group represented by R' above, preferably the R's are the same alkyl group. Illustratively, R' is methyl, ethyl, propyl, isopropyl, n-butyl, isobutyl, t-butyl, amyl, t-amyl, hexyl, heptyl, octyl, 2,4,4-trimethylpentyl, nonyl, decyl and the like. R' is preferably a $C_4$–$C_5$ tertiary alkyl group.

The preferred polyol components have the formula

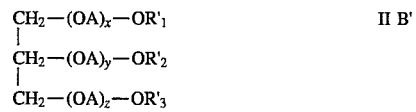

$$\begin{array}{l} CH_2\text{—}(OA)_x\text{—}OR'_1 \\ | \\ CH_2\text{—}(OA)_y\text{—}OR'_2 \\ | \\ CH_2\text{—}(OA)_z\text{—}OR'_3 \end{array} \quad \text{II B'}$$

where $R_1$, $R_2$ and $R_3$ are each hydrogen or a $C_1$–$C_{14}$ alkyl group with the proviso that at least one of $R'_1$, $R'_2$ or $R'_3$ is a $C_1$–$C_{14}$ alkyl group, A is a $C_2$–$C_4$ alkylene group and x, y and z are each selected from an integer from 0–10. Preferably $R_1$ and $R_3$ are the same alkyl group, such as methyl, ethyl, propyl, isopropyl, n-butyl, isobutyl, t-butyl, amyl, t-amyl, hexyl, heptyl, octyl, nonyl, decyl and the like. Most preferably, $R_1$ and $R_3$ are the same $C_4$–$C_5$ tertiary alkyl group. Mixtures can be employed including mixtures of additives with different alkyl groups and/or different oxyalkylene groups; mixtures of 1,2 diether, 1,3 diether and 1,2,3 triether are preferred.

The preferred compounds of Formula II B' are those having R' representing a butyl group, A representing an ethylene or propylene, y is 0 to 10 and each x and z is 2 or 3. The most preferred adduct is dipropylene glycol mono-t-butyl ether and tripropylene glycol mono-t-butyl ether.

In the case of the derivatives of glycerin, preferred components of the subject admixture are those having the following formula:

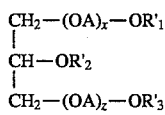

wherein $R_1$ and $R_3$ are $C_1$–$C_{16}$ alkyl groups, preferably t-butyl or t-amyl groups, $R_2$ is hydrogen, x and z are each 4–10 and A is propylene. The preparation of such materials is shown, for example, in U.S. Pat. Nos. 2,932,670, 2,932,616 and 4,241,224.

In a particularly preferred practice, the glycerin is etherified by reaction with isobutylene or t-butanol or the corresponding $C_5$ or $C_6$ materials, in order to produce a product mixture comprised primarily of the 1,3-di-t-alkyl ether and lesser amounts of the 1,2-di-t-alkyl ether and the 1,2,3-tri-t-alkyl ether of glycerin. Especially advantageous in this reaction is the use of a highly cross-linked sulfonic acid resin catalyst such as AMBERLYST XN1010 with an isoalkane to glycerin ratio of 2:1 or higher at temperatures in the range of 40°–150° C., preferably 75° C.

The second component of the subject admixture is selected from at least one ammonium salt of tall oil fatty acid. Tall oil fatty acids, as used herein and in the appended claims refers to resin acids, rosin acids and fatty acids having from about 12 to 22 carbon atoms. For example, tall oil acids are obtained as a by-product of sulfate wood pulp digestion and consist mainly of resin, rosin and fatty acids, such as linoleic, abietic, linolinic and oleic acids. Resin acids may also be obtained as the oxidation product of terpines, such as pimaric acid. The ammonium salt found useful herein is formed with an organic amine. Of the organic amines a secondary amine is preferred and a tertiary amine is most preferred. The amine compound may be represented by the formula

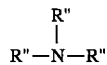

wherein each R" represents hydrogen atom, a $C_1$–$C_5$ alkyl or a $C_2$–$C_5$ hydroxyalkyl, provided at least one R" is an alkyl or hydroxyalkyl group. The preferred organic amines are tri(hydroxyalkyl)amines. Examples of such compounds are ethyldiethanolamine, diethylethanolamine, propyl diethanolamine, triethanolamine, propyldipropanolamine, triisopropanolamine, t-butyl dipropanolamine and the like.

The salt can be formed by introducing the amine into the tall oil fatty acid at ambient conditions with continuous mixing. Normally the amine is introduced in approximately molar equivalence with the acid. However, because the tall oil fatty acid material is a mixture of acids, it is preferred to provide excess molar equivalence of the amine. Thus, one can form the useful ammonium salt of tall oil fatty acid by mixing the amine to acid in from about 1:1 to 1.5:1 molar amounts. In general, a weight ratio of amine to acid is from 1:1 to 3:1.

The subject cement admixture should contain a mixture of at least one of the above described oxyalkylene compounds with at least one ammonium salt of tall oil fatty acid. When the subject admixture is used as an improved admixture capable of inhibiting drying shrinkage of cement compositions without exhibiting deactivation of conventional AE agents to entrain air therein, the mixture needs to contain the ammonium salt in minute, catalytic amounts such as from about 0.0002 to 0.02 (preferably from 0.0002 to 0.005 and most preferred from 0.0005 to 0.005) part by weight for each part of oxyalkylene compound present in the mixture. The exact amount of ammonium salt required to overcome deactivation of the oxyalkylene component will depend on the particular oxyalkylene. compound used to form the admixture and can be determined by the artisan. As stated above, it has been unexpectedly found that combining catalytic amounts of ammonium salt of tall oil fatty acid to the oxyalkylene compounds described above provides an admixture which can be further treated with conventional AE agents to impart the desired air void volume in the set formation.

It has also been unexpectedly found that in lieu of utilizing other AE agents to impart air entrainment into the treated cement composition structure, one can merely utilize additional amounts of the same or a different ammonium salt of tall oil fatty acid. The exact amount required will depend upon the amount of air volume desired. However, generally the ratio of ammonium salt to oxyalkylene compound need not be greater than 0.5:1.

The present cement admixture may be added to the hydraulic cement or to the cement composition. For example, the present admixture can be applied to cement powder during blending with other materials to prepare a specific type of cement. Alternately, an improved cement composition can be formed in situ during the course of preparing a cement composition, such as a mortar or a concrete. The admixture can be added separately or as part of the water of hydration.

The present admixture may be either a neat composition (a liquid having only oxyalkylene compound and ammonium salt) or as an aqueous solution. The present admixture is a stable solution which does not separate over time. Thus, the admixture is storage stable and can be readily dispensed without concern about proper dosage of each component or require agitation of the storage drum to cause mixing of the components.

The present cement admixture should be used in from about 0.1 to about 5, preferably from about 0.5 to 3 and most preferably from about 1 to 3 weight percent based on the cement content of the cement composition (mortar or concrete) being treated.

The cement composition can be formed with conventional amounts of water, such as a water to cement ratio of from 0.25:1 to 0.6:1 and preferably from 0.3:1 to 0.5:1. Aggregate, such as pebble, gravel, sand, pumice, fired perlite and the like may be employed in conventional amounts. The exact amount will depend upon the particular application and the standard (ASTM or the equivalent) which is applicable.

Various additional ingredients may be optionally employed to form the cement composition. Such ingredients include set accelerators as, for example, metal halides, metal sulfates, metal nitrites and the like; set retarders as, for example, alcohols, sugars, starch, cellulose and the like; corrosion inhibitors as, for example, alkali metal nitrates, alkali metal nitrites and the like; water reducing agents and superplasticizers, as for example, lignon sulfonic acid, condensation products of naphthalene sulfonate-formaldehyde and melamine sulfonate-formaldehyde, polyacrylates, and the like. These optional ingredients are normally employed in from about 0.05 to 6 percent by weight based on the weight of the cement contained in the cement composition.

As stated above, the present cement composition can be treated with conventional AE agents to impart the desired amount of micro air voids in the resultant formation. It is normally desired to have between about 4 to 10 volume percent air voids in the resultant structure. AE agents are normally used in from 25 to 75× $10^{-4}$ percent based on the cement content of the treated composition.

The resultant cement composition containing the subject admixture may be applied in conventional manners. The composition may be case and troweled or injected and cured by air drying, wet air, steam assisted or the like.

The resultant cement composition provided an architectural structural formation which has the desired air void volume and substantial decrease in cracking due to drying shrinkage. The formation has enhanced durability.

The following examples are given for illustrative purposes only and are not meant to be a limitation on the subject invention, as defined by the appended claims. All parts and percentages are by weight unless otherwise indicated. The term "S/S" refers to weight of solid additive based on weight of hydraulic cement.

EXAMPLE 1

The tall oil fatty acid salts used herein were formed by mixing 1 part of tall oil fatty acid obtained as a sulfate wood pulp by-product with 2 parts of either triethanolamine or 2 parts of triisopropanolamine at room temperature. The salts were then mixed with an oxyalkylene ether adduct of butanol, specifically di(oxypropylene)glycol-t-butyl ether in a ratio of 2:0.005.

Concrete samples were made using a concrete mixture design proportioned by a volumetric method according to ACI guidelines. The design requirements were based on 611 parts Type I Portland cement, 1140 parts West Sand fine aggregate, 1750 parts 0.75 inch crushed gravel, and 306 parts water. The water and small aggregate contents were further adjusted to project design parameters of 6% air content, 0.5:1 water to cement ratio and slump of between 5" to 6".

The water, coarse aggregate and fine aggregate (and when appropriate, commercial AE agent Daravair-100, a vinsol gum resin product of W. R. Grace & Co.) were initially charged into a concrete mixer and mixed for one minute. The Portland cement was then added and mixing was continued for an additional minute. The subject admixtures composed of mixtures of dipropylene glycol butyl ether with either triethanolamine salt of tall oil fatty acid or triisopropanolamine salt of said acid were then added to the mixer for appropriate samples as indicated in Table I below and mixing was further continued for two additional minutes, then three minutes of rest followed by a final two minutes of mixing. The resultant concrete samples were tested according to ASTM C-143 for slump, ASTM C-138 for weight and yield, ASTM C-231 for air content of freshly mixed samples.

The results of Table I show that while a conventional AE agent, DARAVAIR-1000 (an alkali neutralized gum rosin, product of W R. Grace & Co.) provides the required 5–6% air of the design parameter, the presence of oxyalkylene compound inhibit the activity of the AE agent requiring a five-fold increase in dosage to obtain equivalent air content (Sample 3). Mixtures (Samples 4, 5) of the oxyalkylene compound with small amounts of ammonium salts of tall oil fatty acid still did not give the desired plastic air content. However, such mixtures were capable of attaining desired plastic air content with conventional dosages of AE agent, as shown by Samples 6 and 7.

TABLE I

| Sample | Mixture Adduct | Tall Oil Salt | Ratio | Dosage wt % S/S | AE Agent | Dosage oz/cwt | Plastic Air % |
|---|---|---|---|---|---|---|---|
| 1 | — | — | — | — | Daravair | 0.8 | 5.6 |
| 2 | DPGBE | — | — | — | — | — | 2.2 |
| 3 | DPGBE | — | — | 2 | Daravair | 4.0 | 6.0 |
| 4 | DPGBE | TOFA-TEA | 400:1 | 2 | — | — | 3.5 |
| 5 | DPGBE | TOFA-TIPA | 400:1 | 2 | — | — | 3.0 |
| 6 | DPGBE | TOFA-TIPA | 400:1 | 2 | Daravair | 3.0 | 5.0 |
| 7 | DPGBE | TOFA-TIPA | 400:1 | 2 | Daravair | 2.0 | 5.0 |

DPGBE = dioxypropylene glycol-butyl ether
TOFA-TEA = tall oil fatty acid - triethanolamine
TOFA-TIPA = tall oil fatty acid - triisopropanolamine

EXAMPLE 2

Concrete samples were formed and tested according to the methods described in Example 1 above except that the concrete mix design comprised 517 parts Type I Portland cement, 1140 parts West Sand fine aggregate, 1850 parts coarse aggregate composed of 740 parts 0.75 Wrentham crushed gravel, 370 parts 1 inch Au Claire gravel, 370 parts 0.675 Au Claire gravel and 370 parts 0.375 Au Claire gravel, and 263 parts water. The mixtures were adjusted to have an initial slump of between 3 and 4 inches by adjusting the water content and taking into account the liquid admixture materials.

Samples 8, 9 and 10 were formed for comparative purposes. In Sample 8, the standard concrete mix was treated with an AE agent (Daravair-M, a vinsol resin by-product sold by W. R. Grace & Co.) to achieve a plastic air content of 5.3 percent. In Sample 9, the concrete was treated with 1.5 percent S/S of a drying shrinkage composition composed of oxyalkylenes of dipropylene glycol-t-butyl ether (DPGBE) and dipropylene glycol (DPG) (2:1 wt. ratio). The water content was adjusted because of the liquid oxyalkylene compounds present to provide the desired slump. A 3.5 fold increase in Daravair was required to achieve the design plastic air content. In Sample 10, the concrete was treated with 1.32 percent S/S of shrinkage reduction admixture composed of DPGBE and DPG (2:1 wt. ratio) which further contained an alkylene oxide water reducer in 0.18 percent S/S. This sample required about a 13 fold dosage increase of Daravair AE agent to achieve the design plastic air content.

In comparison, Example 11 was formed with an admixture of the present invention composed of 1.25 percent S/S of DPGBE with 0.17 percent S/S of a water-reducing agent and 0.02 percent S/S of triisopropanolamine tall oil fatty acid salt. One achieves the design plastic air content with only 1.2 oz/yd$^3$ weight dosage.

The specific results are shown in Table II herein below.

TABLE II

| Sample | Oxyalkylene | Amt. % S/S | Tall Oil Salt | Amt. % S/S | W/C | AE Agent | Amt. oz/wt | Plastic Air % | Slump (in.) |
|---|---|---|---|---|---|---|---|---|---|
| 8 | — | — | — | — | 0.5 | Daravair | 0.6 | 5.3 | 3.75 |
| 9 | DPGBE/DPG | 1.5 | — | — | 0.48 | Daravair | 2.0 | 5.6 | 3.25 |
| 10 | DPGBE/DPG | 1.32 | — | — | 0.46 | Daravair | 7.6 | 5.7 | 3.5 |
| 11 | DPGBE/DPG | 1.25 | TOFA-TIPA | 0.02 | 0.44 | Daravair | 1.2 | 5.6 | 3.5 |

What is claimed is:

1. A cement admixture capable of inhibiting drying shrinkage while maintaining air void content of a treated cement composition containing said cement admixture comprising a mixture of:
   A. at least one oxyalkylene compound selected from:
   i) oxyalkylene glycols represented by the formula $HO(AO)_nH$ wherein A represents a $C_2$–$C_4$ alkylene group, O represents an oxygen atom, and n represents an integer of from 1 to about 30;
   ii) oxyalkylene adducts of monoalcohols represented by the formula $RO(AO)_mH$ wherein R represents a $C_1$–$C_7$ alkyl or a $C_5$–$C_6$ cycloaklyl group, A represents a $C_2$–$C_4$ alkylene group, O represents an oxygen atom and m represents an integer of from 1 to about 10;
   iii) oxyalkylene adducts of polyols represented y the formula $Q[(OA)_pOR']_x$ wherein Q represents a $C_3$–$C_{12}$ aliphatic hydrocarbon residual group of a polyhydroxyalkane, each R' independently represents a $C_1$–$C_{14}$ alkyl or cycloalkyl group or hydrogen atom provided at least one R' of said adduct represents a $C_1$–$C_{14}$ alkyl or cycloalkyl group; A represents a $C_2$–$C_4$ alkylene group; O represents an oxygen atom; p represents an integer of from 0 to about 10; and x represents an integer of from 3 to 5; or
   iv) mixtures of said oxyalkylene compounds; and
   B. at least one ammonium salt of tall oil fatty acid wherein the weight ratio of component B to component A is at least about 0.0002 to 1.

2. The admixture of claim 1 wherein the oxyalkylene compound is selected from at least one oxyalkylene glycol.

3. The admixture of claim 2 wherein the oxyalkylene glycol is selected from polypropylene glycol, polyethylene glycol or poly(oxyethylene)(oxypropylene) glycol wherein each of said oxyethylene and oxypropylene groups may have a random or block distribution.

4. The admixture of claim 1 wherein the oxyalkylene compound is selected from at least one oxyalkylene adduct of a monoalcohol wherein R is a $C_3$–$C_5$ alkyl and A is a $C_2$–$C_3$ alkylene group or mixtures thereof.

5. The admixture of claim 4 wherein the oxyalkylene adduct of a monoalcohol has A representing propylene groups, R representing butyl groups and m represents 2 or 3.

6. The admixture of claim 1 wherein the oxyalkylene compound is selected from at least one oxyalkylene adduct of a polyol wherein R' represents a tertiary alkyl, Q is a residual group of glycerin and A is a $C_2$–$C_3$ alkylene.

7. The admixture of claim 6 wherein the oxyalkylene compound is selected from 1,2-di-t-butyl glycerin, 1,3-di-t-butyl glycerin, 1,2,3-tri-t-butyl glycerin or mixtures thereof.

8. The admixture of claim 2, 3, 4, 5, 6 or 7 wherein the ammonium salt is an organic amine salt of tall oil fatty acid; said organic amine represented by the formula

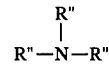

wherein each R" independently represents a hydrogen atom, a $C_1$–$C_5$ alkyl group or a $C_2$–$C_5$ alkyl or hydroxyalkyl group provided at least one R" is selected from a $C_2$–$C_5$ hydroxyalkyl group; and the ratio of Component B to Component A of the admixture is from about 0.0002:1 to about 0.02:1.

9. The admixture of claim 8 wherein at least one R" group represents a $C_2$–$C_5$ hydroxyalkyl group and any remaining R" groups represent a $C_1$–$C_5$ alkyl group; and the ratio of Component B to A is from about 0.0005:1 to 0.005:1.

10. A method of inhibiting dry shrinkage in cement compositions while imparting the ability to provide air void content to formations formed from said composition comprising adding to the cement composition from 0.1 to about 5 weight percent based on the weight of the hydraulic cement contained in said composition of the admixture of claim 1.

11. The method of claim 10 wherein the cement composition is a concrete composition comprising hydraulic cement, small particulate, large particulate and water.

* * * * *